US012290707B1

(12) United States Patent
Freedman

(10) Patent No.: US 12,290,707 B1
(45) Date of Patent: May 6, 2025

(54) CLEANABLE FACIAL COVERING WITH EMBEDDED N95 FILTER

(71) Applicant: Dignity Health, San Francisco, CA (US)

(72) Inventor: Frank Freedman, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 331 days.

(21) Appl. No.: 17/807,995

(22) Filed: Jun. 21, 2022

Related U.S. Application Data

(60) Provisional application No. 63/212,875, filed on Jun. 21, 2021.

(51) Int. Cl.

*A41D 13/11* (2006.01)
*A62B 23/02* (2006.01)
*A62B 18/08* (2006.01)

(52) U.S. Cl.

CPC ........ *A62B 23/025* (2013.01); *A41D 13/1184* (2013.01); *A41D 13/1161* (2013.01); *A62B 18/082* (2013.01)

(58) Field of Classification Search

CPC ................ A41D 13/11; A41D 13/1161; A41D 13/1184; A62B 18/02; A62B 23/025; A62B 18/082

See application file for complete search history.

(56) References Cited

U.S. PATENT DOCUMENTS

| | | | | |
|---|---|---|---|---|
| 6,079,980 | A * | 6/2000 | Durand | A61C 5/90 128/206.13 |
| 7,191,778 | B2 * | 3/2007 | Shue | A62B 18/025 128/205.27 |
| 9,149,669 | B2 * | 10/2015 | Cowell | A62B 18/084 |
| 10,945,469 | B1 * | 3/2021 | Rosenberg | A62B 18/08 |
| 2021/0353972 | A1 * | 11/2021 | Adam | B01D 46/16 |
| 2021/0401084 | A1 * | 12/2021 | Lamoncha | A41D 13/1184 |
| 2022/0295920 | A1 * | 9/2022 | Van Der Hoeven | A41D 13/1161 |

* cited by examiner

*Primary Examiner* — Keri J Nelson

(74) *Attorney, Agent, or Firm* — Polsinelli PC

(57) ABSTRACT

Various embodiments of a rapid-manufacturable and cleanable face covering including a base component that retains a filter material, a cover component that encapsulates the filter material for providing an integrated face shield, and an injection-molded silicon sealant that seals the facial covering against the face. The cover component and base are each vacuum thermoformed for rapid manufacture from polyethylene terephthalate glycol (PETG) or another suitable material.

14 Claims, 12 Drawing Sheets

CLEANABLE FACIAL COVERING WITH EMBEDDED N95 FILTER

CROSS-REFERENCE TO RELATED APPLICATIONS

This is a non-provisional application that claims benefit to U.S. Provisional Patent Application Ser. No. 63/212,875 filed 21 Jun. 2021, which is herein incorporated by reference in its entirety.

FIELD

The present disclosure generally relates to personal protective equipment (PPE), and in particular to a system and associated method for a rapid-manufacture cleanable face covering with an embedded N-95 filter.

BACKGROUND

During the COVID-19 pandemic, personal protective equipment (PPE) availability to the medical community as well as the general public was in very short supply. Medical professionals are required to change their facial coverings between patients, and the shortage at the beginning of the pandemic led many medical practitioners to re-use facial coverings or wear them longer than recommended to preserve the supply of facial coverings. Some rapid-manufacture or reusable facial coverings were developed to address the issue, however, many of these designs either required the use of 3D printing materials or were otherwise not cleanable or reusable.

It is with these observations in mind, among others, that various aspects of the present disclosure were conceived and developed.

BRIEF DESCRIPTION OF THE DRAWINGS

FIG. 3 is a cross-sectional side view showing the base component of FIG. 5 taken along line 6-6 of FIG. 5;

FIG. 3 is a cross-sectional side view showing the base component of FIG. 8 taken along line 9-9 of FIG. 8;

Corresponding reference characters indicate corresponding elements among the view of the drawings. The headings used in the figures do not limit the scope of the claims.

DETAILED DESCRIPTION

Figure 1:
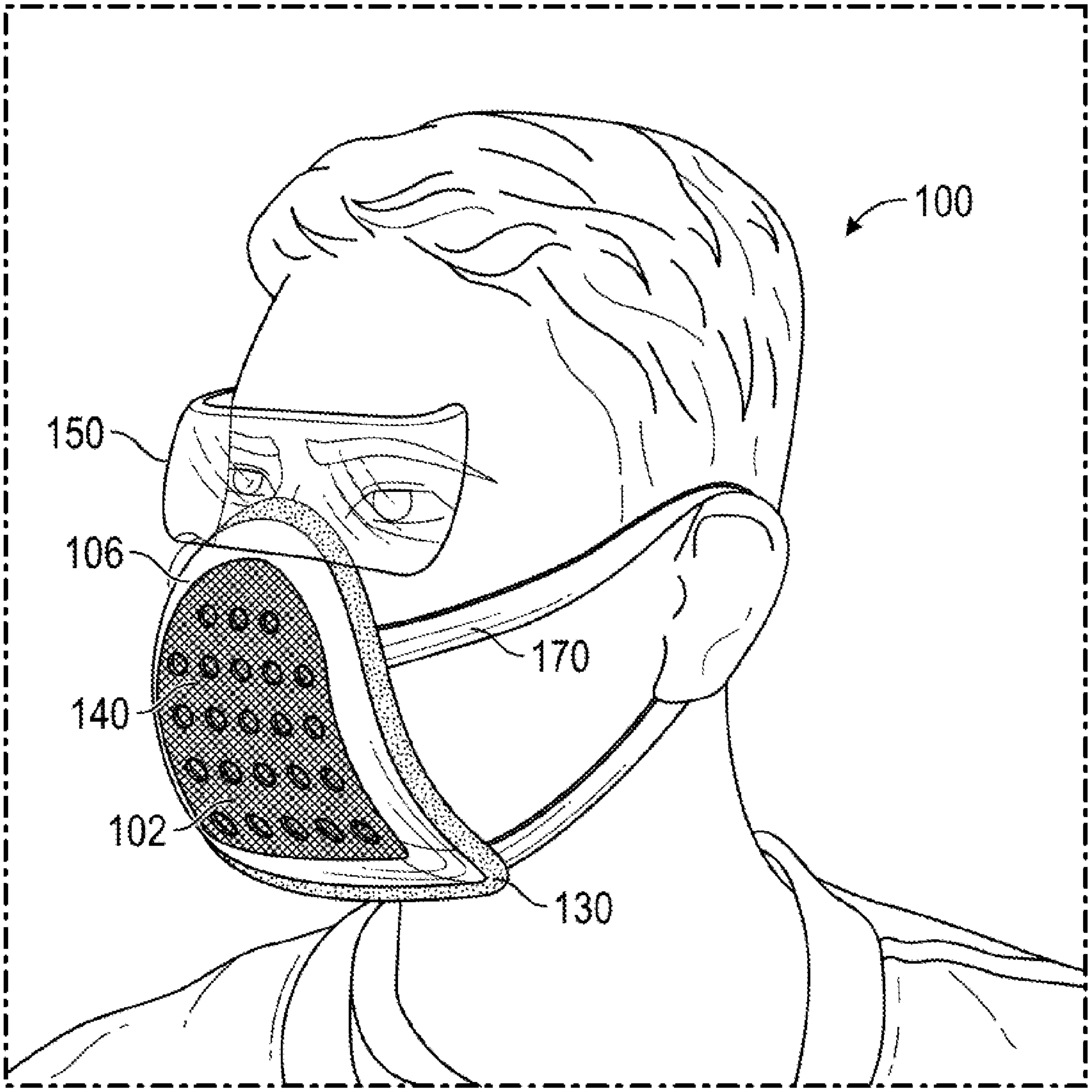
FIG. 1 is a perspective view showing a facial covering being worn on the face of a user.

Various embodiments of a system and associated method for the rapid-manufacture cleanable filtered facial covering are disclosed herein. In particular, the facial covering includes a base component that retains a filter material, a cover component that encapsulates the filter material for providing an integrated face shield, and an injection-molded silicon sealant that seals the facial covering against the face. The facial covering includes one or more vents defined along the bottom of the cover component to allow air intake through the filter while simultaneously shielding the face from harmful particles. The base component includes a manifold that defines a plurality of holes configured to intake air through the filter material. In some embodiments, the cover component includes an integrated eye shield. In some embodiments, the cover component and base are each vacuum thermoformed for rapid manufacture from polyethylene terephthalate glycol (PETG) or another suitable material. Referring to the drawings, embodiments of a system and associated method for a cleanable rapid-manufacture N95 facial covering (hereinafter "facial covering") are illustrated and generally indicated as 100 in FIGS. 1-17.

Referring to FIGS. 1 and 14-16, the facial covering 100 includes a base component 102 configured to seal against the face of a wearer and receive a filter material 140. The facial covering 100 further includes an associated cover component 106 configured to engage the base component 102 and encapsulate the filter material 140.

The base component 102 includes a filter seat 129 that receives the filter material 140 and a peripheral edge 122 circumferentially defined around the filter seat 129 that engages the face of the wearer. The filter seat 129 forms a planar surface 125 that defines a manifold 126 for passage of air from outside the base component 102, through the filter material 140 and the manifold 126 and into the mouth or nose of the wearer. The peripheral edge 122 can include a seal 130 that creates an air-tight contact between the face and the peripheral edge 122 such that all air drawn through the facial covering is drawn directly through the filter material 140. The cover component 106 is configured to engage the base component 102 and defines a solid front panel 161 that encapsulates the filter material 140 within the filter seat 129 of the base component 102. The cover component 106 further includes an integrated eye shield 150 that extends above the base component 102. In some embodiments, the eye shield 150 is removable from the remainder of the cover component 106 at a perforated edge 152. In some embodiments, a strap assembly 170 can be affixed to the cover component 106 to enable the facial covering 100 to comfortably adhere to the face.

The base component 102 and cover component 106 can both be individually manufactured from sheets of PETG or another suitable material by a vacuum thermoforming process for rapid manufacturability. The filter material 140 can be cut from any N95 filtering material or other suitable particulate-filtering material that is approved for a particular application for ease and speed of manufacture. The seal 130 can be manufactured by injection molding and removably coupled with the base component 102. In another embodiment, the seal 130 is chemically bonded to the base component 102.

Figure 2:
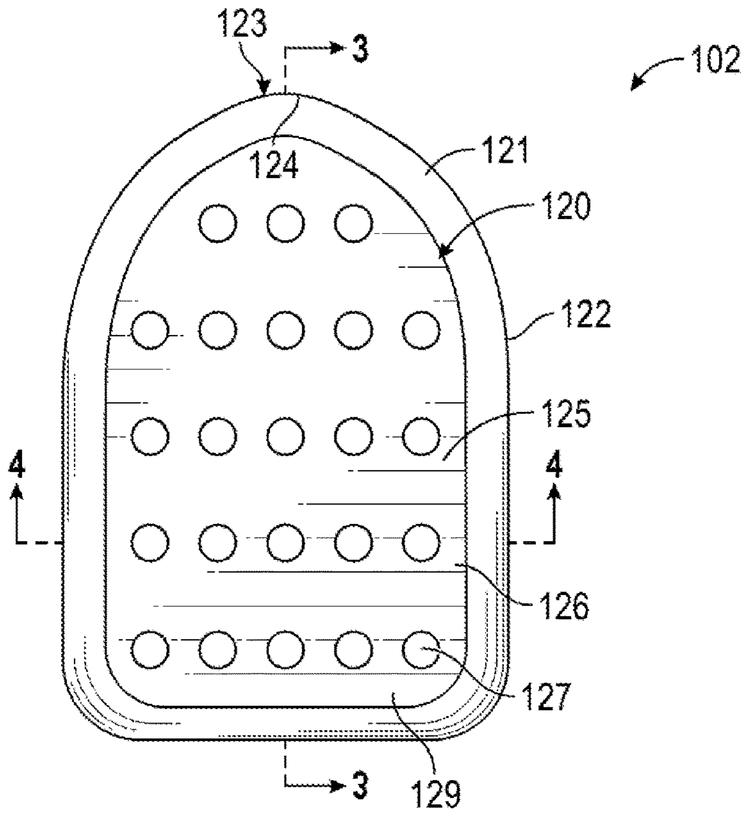
FIG. 2 is a front view showing a base component of the facial covering of FIG. 1 that includes a filter seat forming a generally planar surface defining a manifold having a plurality of apertures and a raised portion defined circumferentially around the planar surface, the raised portion including a peripheral edge configured to engage the face of the user.
Figure 3:
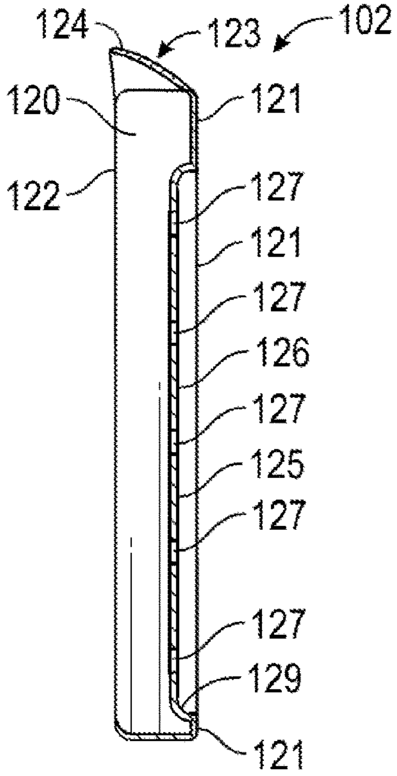
FIG. 3 is a cross-sectional side view showing the base component of FIG. 2 taken along line 3-3 of FIG. 2.
Figure 4:
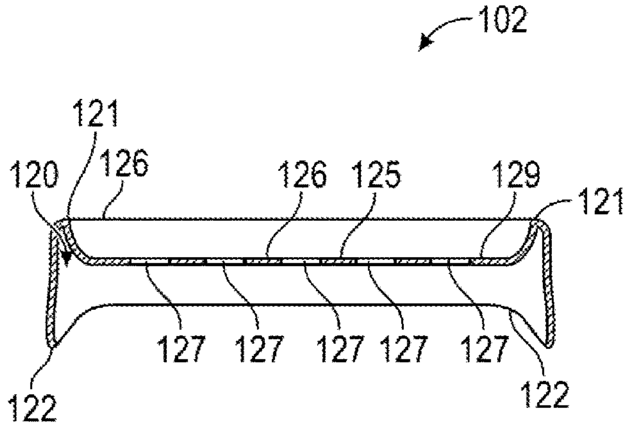
FIG. 4 is a cross-sectional bottom view showing the base component of FIG. 2 taken along line 4-4 of FIG. 2.

Referring to FIGS. 2-4, the base component 102 that receives the filter material 140 (FIGS. 8-10) and adheres against the face of the wearer is illustrated. The base component 102 includes a body 120 that defines the filter seat 129 including the manifold 126 for receipt of the filter material 140 and passage of air through the filter material 140 and manifold 126. The manifold 126 forms a planar surface defining a plurality of apertures 127 for passage of air from outside of the base component 102. The body 120 further includes a raised portion 121 defined circumferentially around the filter seat 129. The raised portion 121 defines the walls of the filter seat 129 and further defines the peripheral edge 122 formed exterior to the raised portion 121 and configured to contact the face of the wearer. In addition, the body 120 of the base component 102 can include a nose receptacle 123 defining an apex 124 formed at a top of the body 120. The body 120 of the base component 102 is curved towards the top of the body 120 to avoid intruding into the wearer's field of view and to follow the contour of the face in a low-profile fit.

The base component 102 can be manufactured from PETG or another suitable material in a vacuum thermoforming process. In particular, the base component 102 can be formed by placing a sheet of material over a mold (not shown) that defines features of the base component 102 as described above and as shown in FIGS. 2-4. The material is subsequently vacuum thermoformed to the mold and the excess removed. Apertures 127 of the manifold 126 can be perforated manually or by machine.

Figure 5:
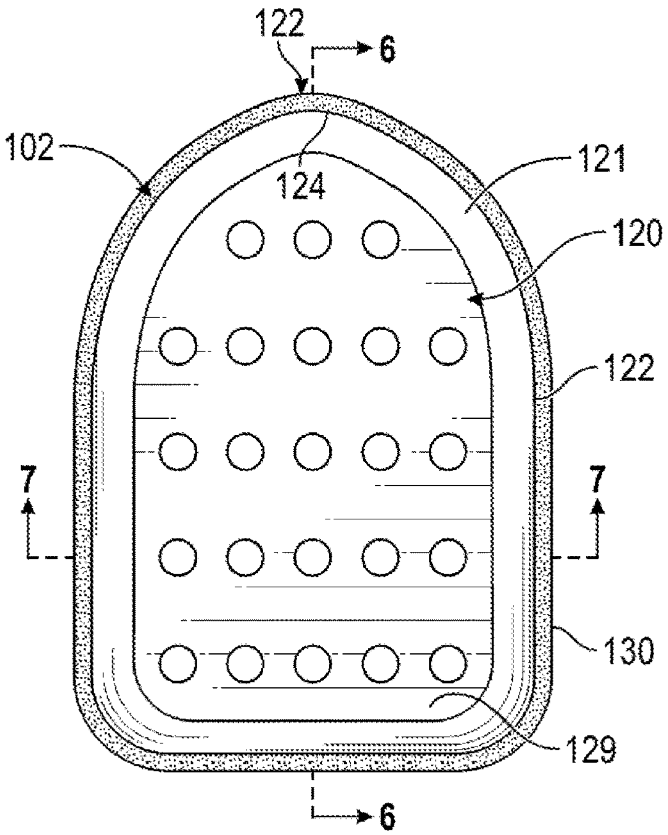
FIG. 5 is a front view showing the base component of the facial covering of FIG. 1 engaged with a silicon sealant around the peripheral edge of the base component.
Figure 6:
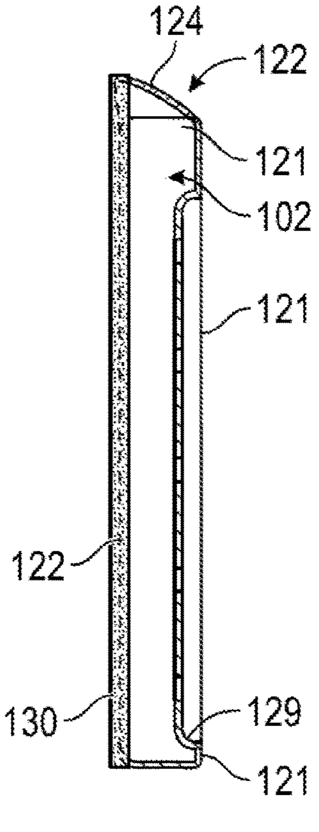
FIG. 6 is
Figure 7:
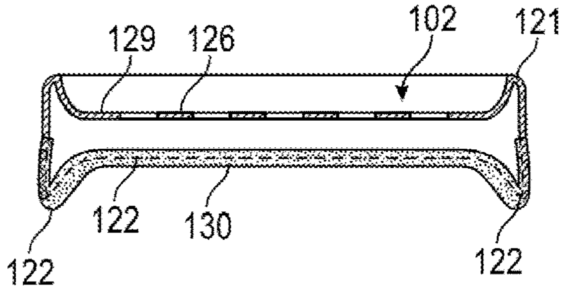
FIG. 7 is a cross-sectional bottom view showing the base component of FIG. 5 taken along line 7-7 of FIG. 5.

Referring to FIGS. 5-7, the seal 130 is configured to engage the peripheral edge 122 of the base component 102. The seal 130 generally follows the same shape as the peripheral edge 122, as shown in FIG. 5. In some embodiments, the seal 130 can include a receptacle (not shown) running along the seal 130 for insertion of the peripheral edge 122 of the base component 102. In other embodiments, the seal 130 can be formed integral to the base component 102 by injection-molding the seal 130 around the peripheral edge 122 of the base component 102 or can separately be injection molded and then engaged with the base component 102.

Figure 8:
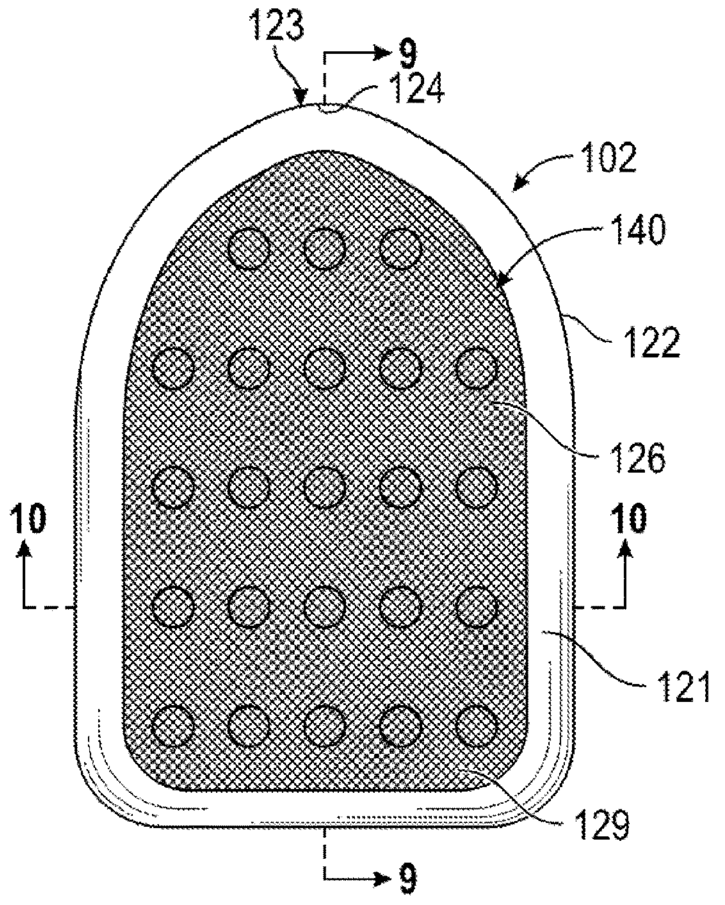
FIG. 8 is a front view showing the base component of the facial covering of FIG. 1 including a filter material engaged within the filter seat of the base component of the facial covering of FIG. 1.
Figure 9:
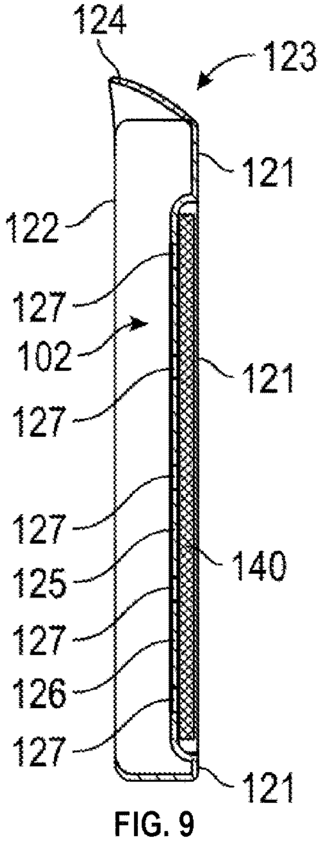
FIG. 9 is
Figure 10:
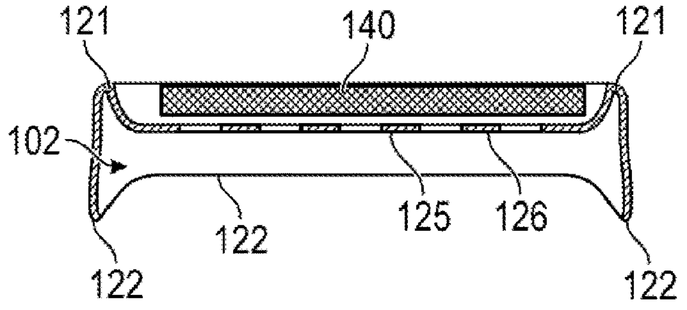
FIG. 10 is a cross-sectional bottom view showing the base component of FIG. 8 taken along line 9-9 of FIG. 8.

Referring to FIGS. 8-10, the filter material 140 is received at the filter seat 129 of the base component 102 to rest against and completely cover the manifold 126 such that the filter material 140 filters all air drawn through the manifold 126. The filter material 140 is cut from any suitable material to fit the general shape of the filter seat 129. In some embodiments, the filter material 140 is an N95 material, however, other approved filtering materials can be included depending on the desired application.

Figure 11:
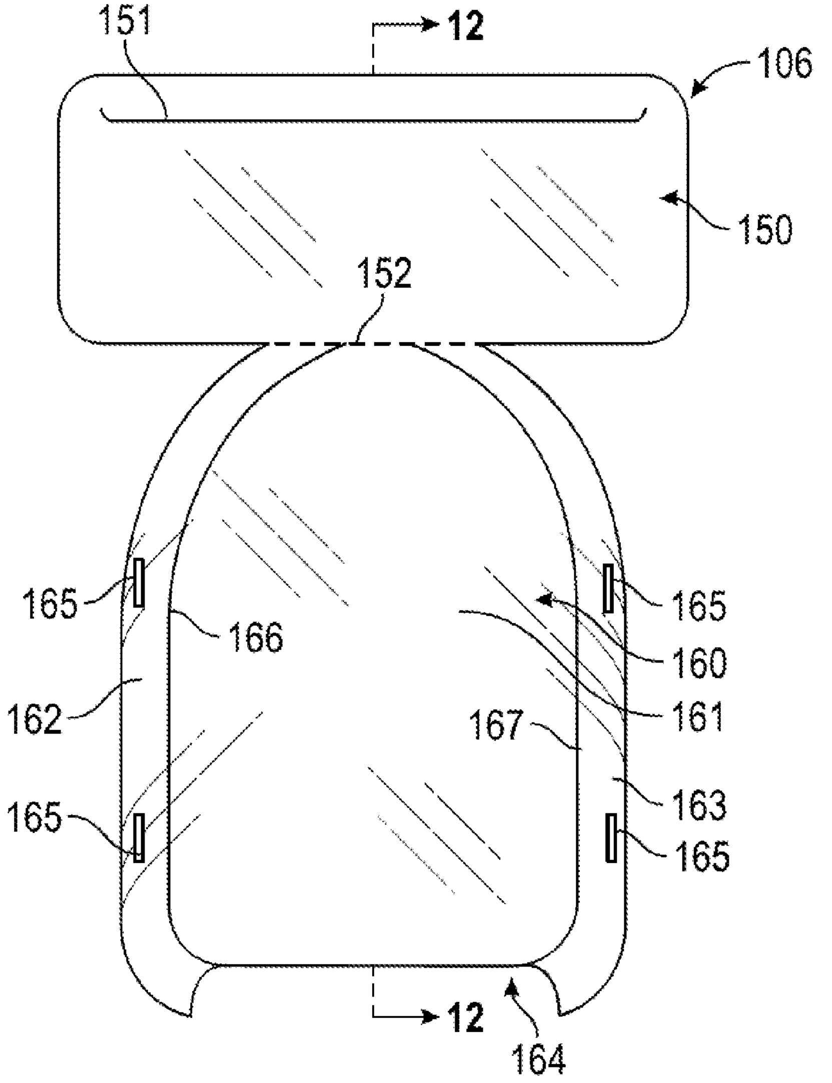
FIG. 11 is a front view showing a cover component of the facial covering of FIG. 1 defining a front panel, respective first and second side panels, and a removable eye shield portion.
Figure 12:
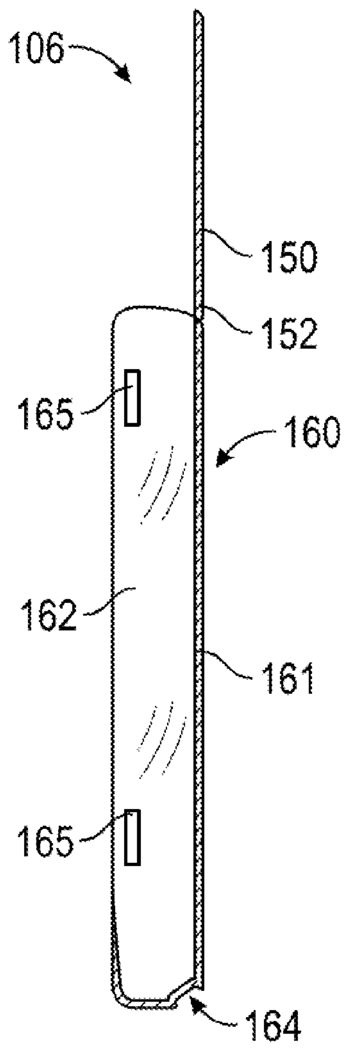
FIG. 12 is a cross-sectional side view showing the cover component of FIG. 11 taken along line 12-12 of FIG. 11.
Figure 13:
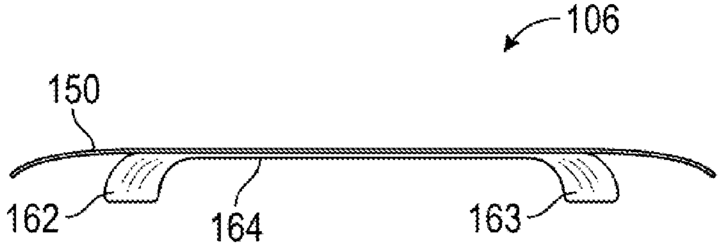
FIG. 13 is a bottom view showing the cover component of FIG. 11.

Referring to FIGS. 11-13, the cover component 106 is configured to engage the base component 102 to encapsulate the filter material 140 and provide a shield for the face. In particular, the cover component 106 defines a cover body 160 that includes a front panel 161. In some embodiments, the front panel 161 defines a solid flat surface that shields the wearer from particulates. The cover body 160 further includes one or more vents 164 formed along the bottom of the cover body 160 to draw air in through the filter material 140 and into the manifold 126. The placement of the one or more vents 164 along the bottom of the cover body 160, while including a solid surface at the front panel 161, allows ambient air to be drawn in from around the facial covering 100 without subjecting the wearer to air or particulates coming from directly in front of the wearer.

The cover body 160 further includes a first side panel 162 and a second side panel 163 defined opposite from the first side panel 162 that encapsulate the raised portion 121 and peripheral edge 122 of the base component 102. In some embodiments, the first side panel 162 meets the front panel 161 at a first cover body crease 166 that allows the first side panel 162 to bend relative to the front panel 161. Similarly, in some embodiments, the second side panel 163 meets the front panel 161 at a second cover body crease 167 that allows the second side panel 163 to bend relative to the front panel 161. In some embodiments, the cover body 160 includes a plurality of strap receptacles 165 which are collectively operable to receive the strap assembly 170.

The cover component 106 further includes an eye shield 150 formed integral to the cover body 160 that provides an additional protective barrier for the eyes of the wearer. The eye shield 150 can extend above the cover body 160 and can be attached at a perforated edge 152. The eye shield 150 can be removed by tearing or cutting along the perforated edge 152. In some embodiments, the curvature is induced for the eye shield 150 by an eye shield crease 151.

Figure 14:
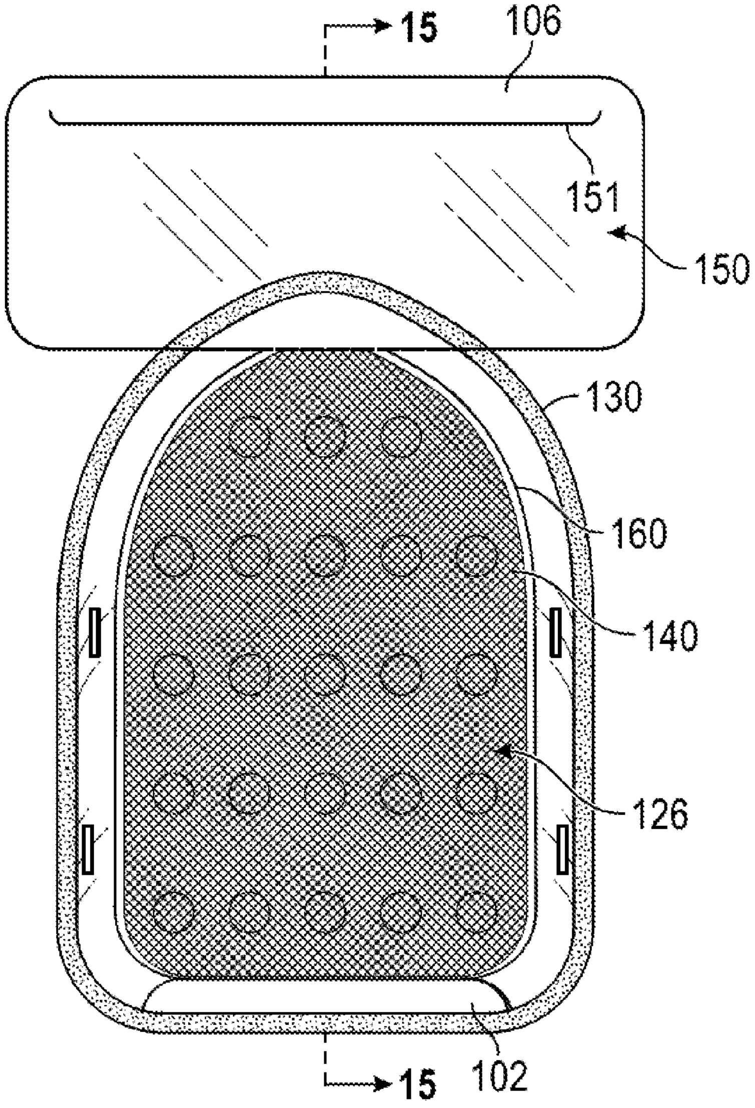
FIG. 14 is an assembled front view showing the assembled facial covering of FIG. 1 including the base component, the filter, and the cover component.
Figure 15:
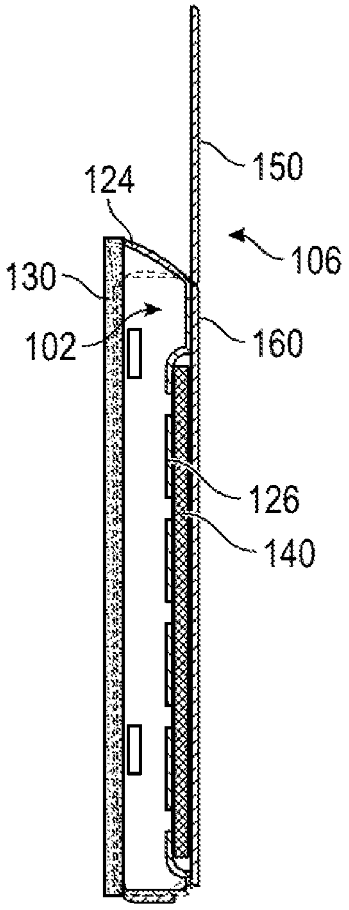
FIG. 15 is a cross-sectional side view showing the assembled facial covering of FIG. 14 taken along line 15-15 of FIG. 14.
Figure 16:
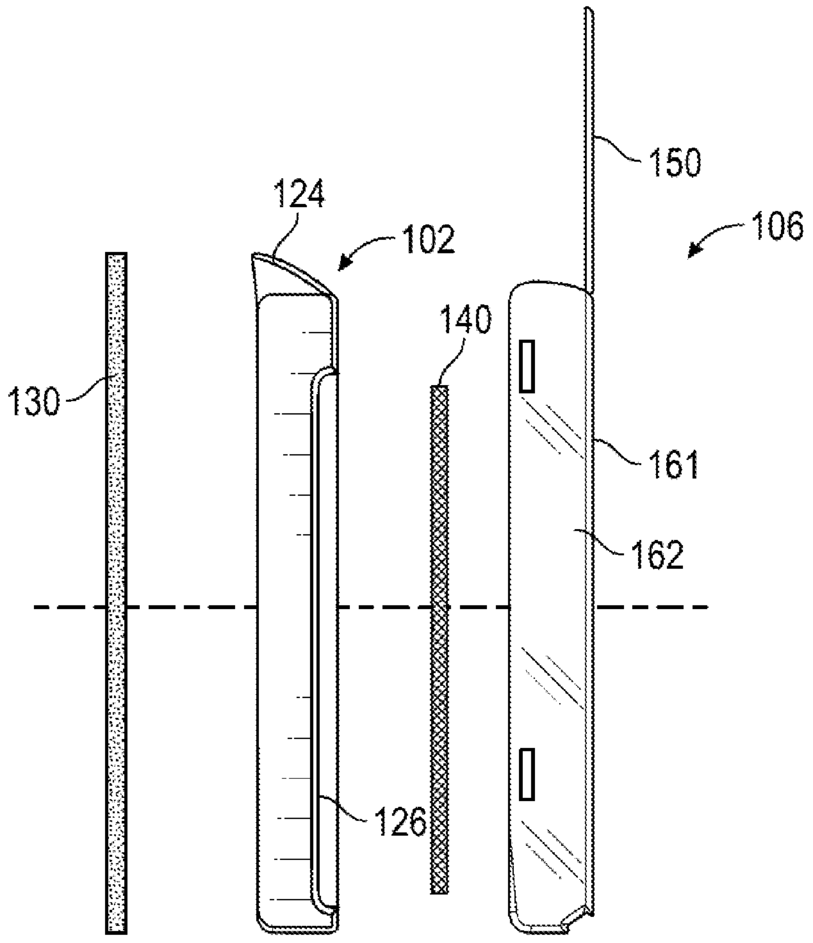
FIG. 16 is an exploded side view showing the assembled facial covering of FIG. 14.

Referring to FIGS. 14-16, the cover component 106 is coupled with the base component 102 such that the filter material 140 is encapsulated between the manifold 126 of the base component 102 and the front panel 161 of the cover component 106. In some embodiments, the cover component 106 and the base component 102 are chemically bonded together using a suitable adhesive to seal the filter material 140 to isolate the inside of the facial covering 100 from the outside environment.

Figure 17:
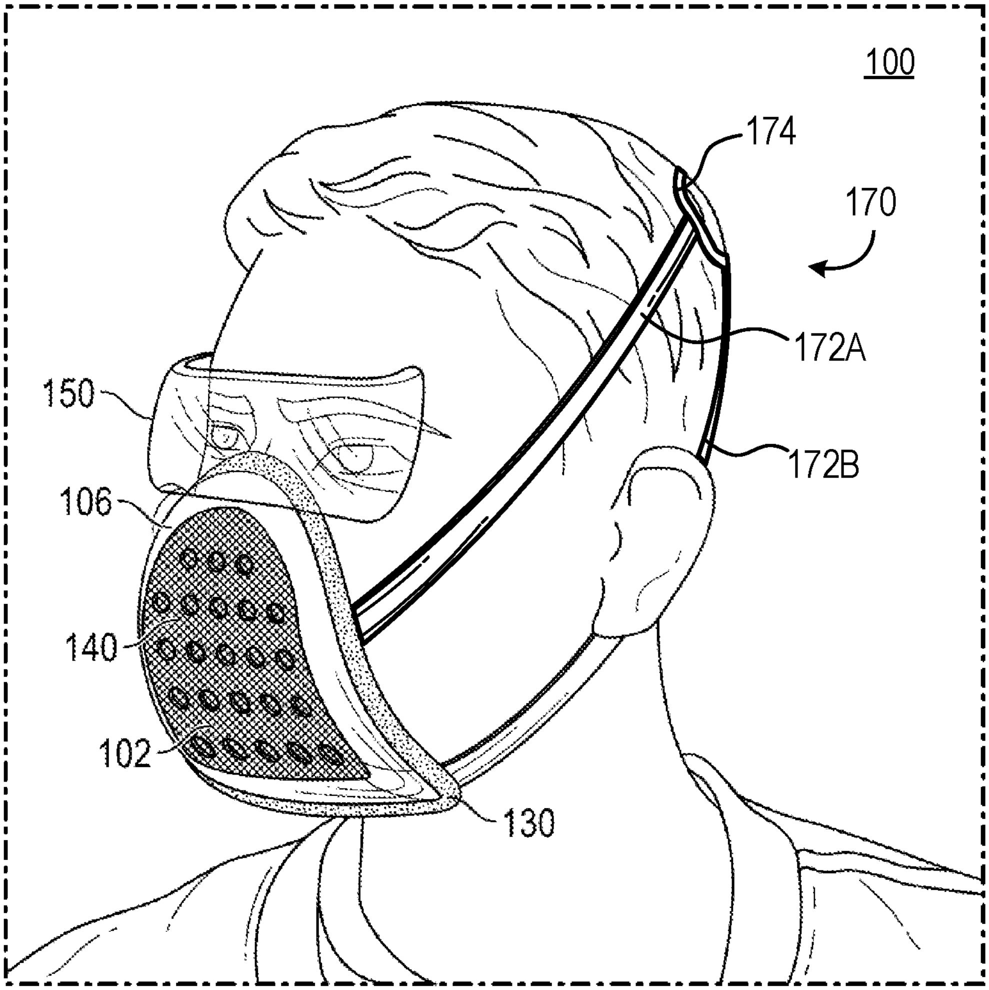
FIG. 17 is a perspective view showing the facial covering of FIG. 1 including an alternate strap assembly.
Figure 18:
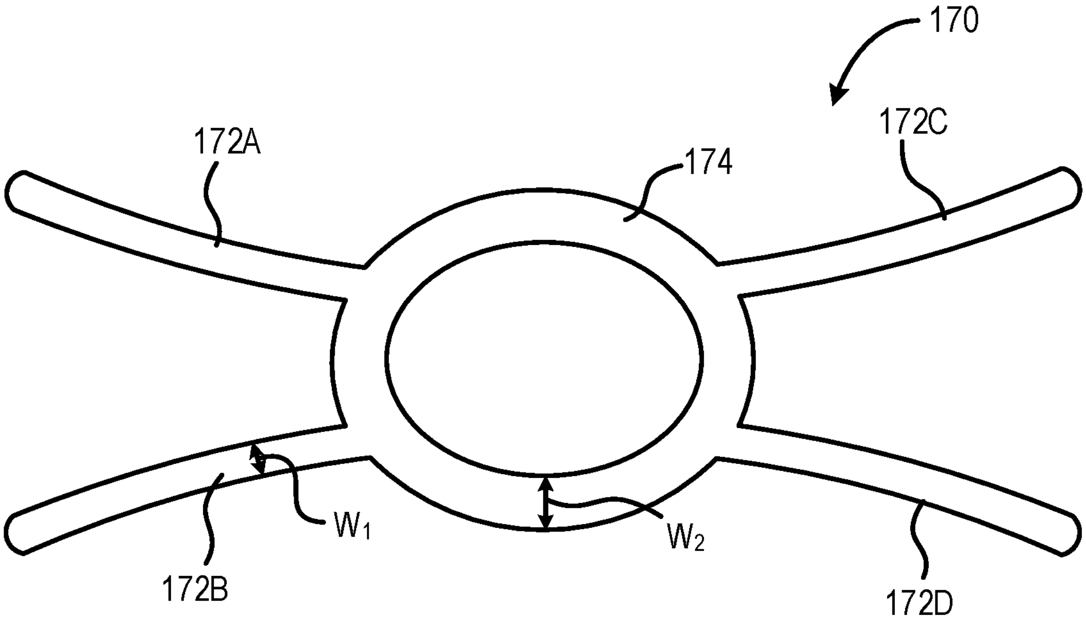
FIG. 18 is a top plan view showing the strap assembly of FIG. 17.
Figure 19A:
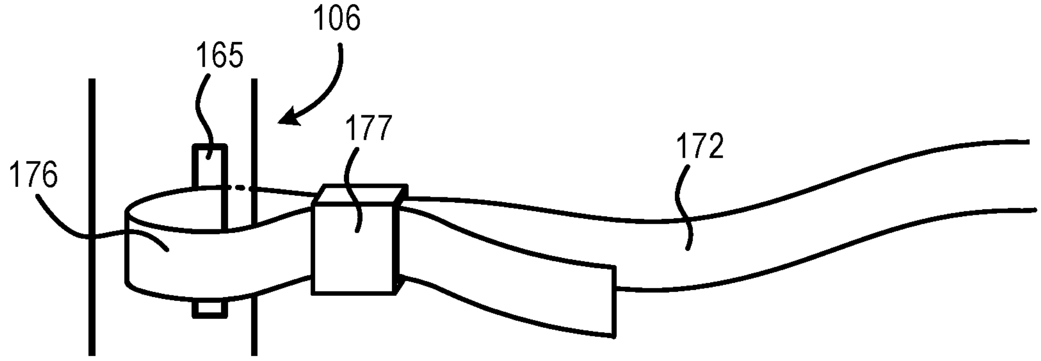
FIGS. 19A and 19B are a pair of side views showing engagement of the strap assembly of FIG. 17 with the cover component of FIG. 11.
Figure 19B:
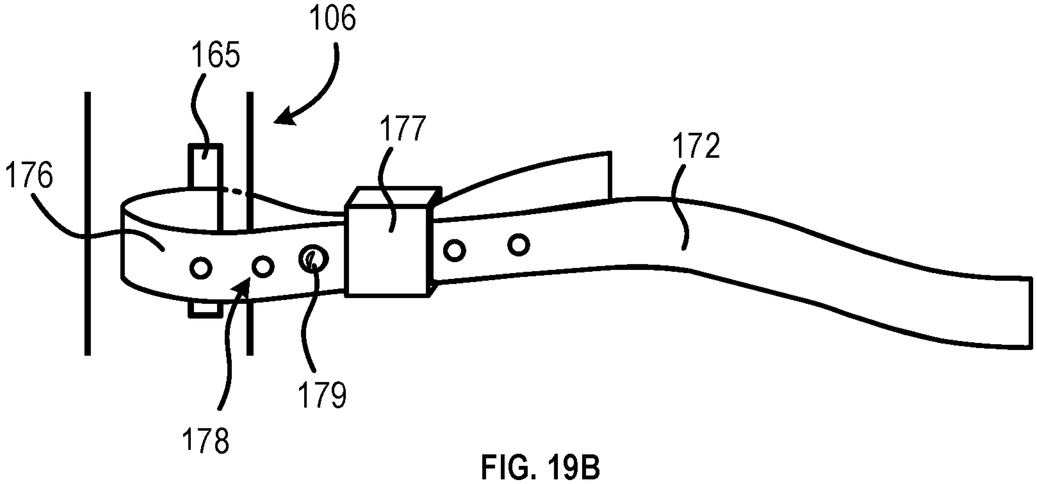

With reference to FIGS. 17-19B, in some embodiments, the strap assembly 170 can be configured to reduce ear strain on the wearer. In particular, the strap assembly 170 can include a plurality of straps 172 (straps 172A-172D in FIG. 18) extending from a strap ring 174 that can be positioned behind the head of the wearer when coupled with the cover component 106 as shown in FIG. 17. In some embodiments, the strap ring 174 and straps 172 can be pressed from a sheet of rubber, silicon or another suitable elastic material and can include a coating that prevents the strap assembly 170 from pulling at or breaking hair during usage. The straps 172 can be of a first width $W_1$ and the strap ring 174 can be of a second width $W_2$; in one example the first width $W_1$ is ¼ inch and the second width $W_2$ is ⅜ inch. In the embodiment shown, the plurality of straps 172 can include a first strap 172A, a second strap 172B, a third strap 172C and a fourth strap 172D, with the first strap 172A and the third strap 172C being configured for positioning above the ears and with the second strap 172B and the fourth strap 172D being configured for positioning below the ears. Further, each respective strap 172 of the plurality of straps 172 can couple at a respective strap receptacle 165 of the plurality of strap receptacles 165 along the cover component 106. FIGS. 19A and 19B show engagement of a strap 172 of the plurality of straps 172 with a strap receptacle 165. The strap 172 can be folded to form a loop 176 that couples around the strap receptacle 165, which can be fastened by knotting the loop, or can be fastened by a fastening element. FIG. 19A shows a first fastening element 177 that captures the strap 172 against itself and remains in place through friction. FIG. 19B shows a second fastening element 179 that includes a button extending from a surface of the strap 172 that couples with one of a plurality of holes 178 along the length of the strap 172. As such, both can enable a wearer to select an optimal strap length.

Figure 20:
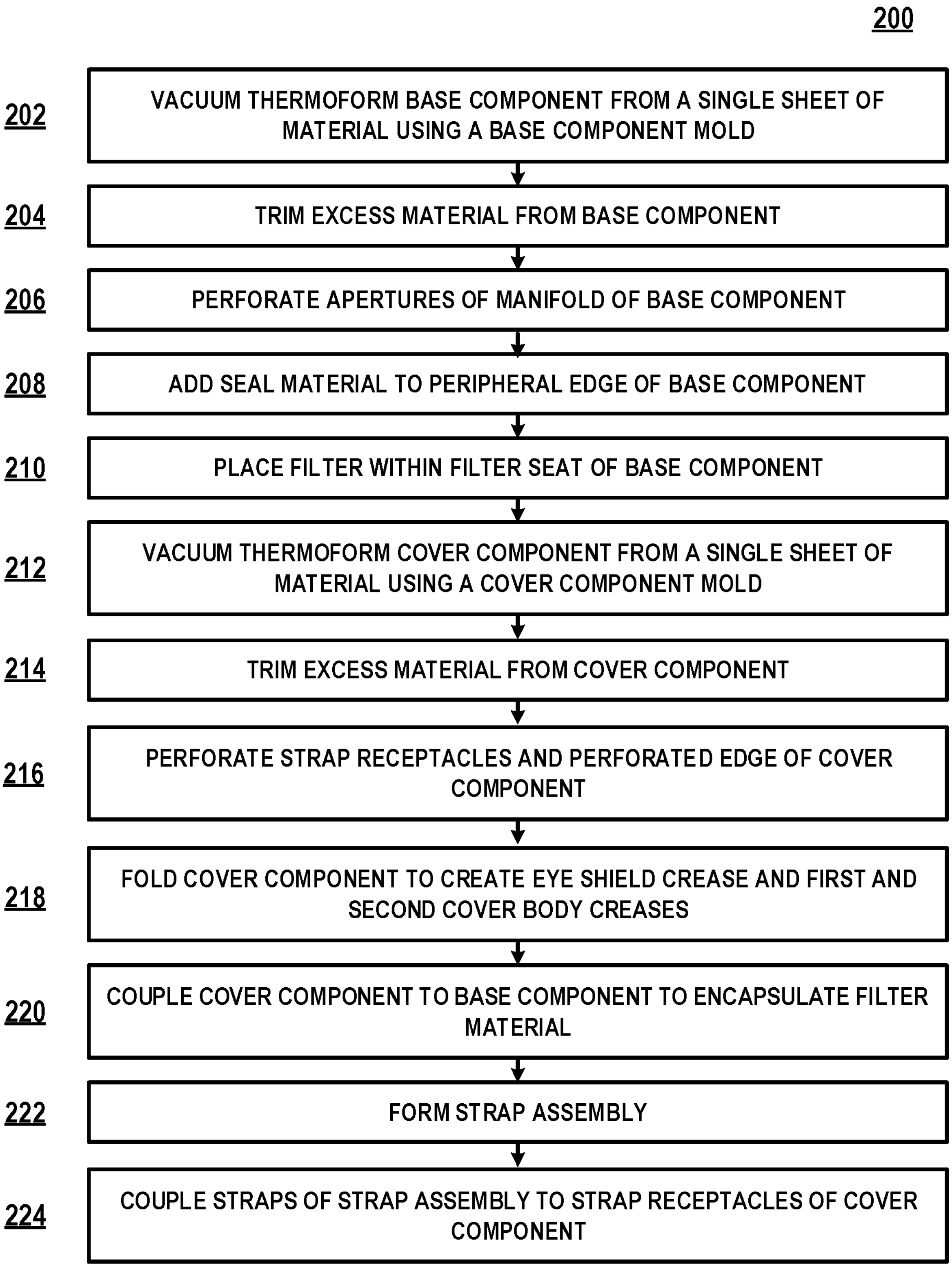
FIG. 20 is a diagram showing a process flow for rapid manufacture of the facial covering of FIG. 1.

Referring to FIG. 20, a process 200 is illustrated that shows a process for rapid manufacture of the facial covering 100 of FIGS. 1-16. At block 202 of process 200, base component 102 is vacuum thermoformed from a single sheet of material using a base component mold (not shown) that fills in negative space to form features of the base component 102. At block 204, excess material is trimmed from the base component 102. At block 206, the apertures 127 of the manifold 126 of the base component are perforated. At block 208, the seal 130 is added to the peripheral edge 122 of the base component 102. In some embodiments, the seal 130 is molded separately from the base component 102 by an injection-molding process and coupled with the peripheral edge 122 of the base component 102. In another embodiment, the peripheral edge 122 of the base component 102 is chemically bonded to the seal 130 by injection-molding the seal 130 directly to the peripheral edge 122 of the base component 102. At block 210, the filter material 140 is placed within the filter seat 129 of the base component 102. At block 212, the cover component 106 is vacuum thermoformed from a single sheet of material using a cover component mold (not shown) that fills in negative space to form features of the base component 102. At block 214, excess material is trimmed from the cover component 106. At block 216, the strap receptacles 165 and perforated edge 152 of the cover component 106 are perforated. At block 218, the cover component 106 is folded to define the eye shield crease 151 and the first and second cover body creases 166 and 167. At block 220, the cover component 106 is coupled to the base component 102 to encapsulate the filter material 140. In some embodiments, the cover component 106 and base component 102 are chemically sealed. At block 222, the strap assembly 170 can be formed by methods outlined herein such as pressing the strap assembly 170 from a sheet of rubber, silicon, or another suitable material. At block 224, the straps 172 of the strap assembly 170 can then be coupled to the cover component 106 at strap receptacles 165.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A facial covering, comprising:
a base component defining a filter seat and a peripheral edge, wherein the filter seat includes a manifold defining a plurality of apertures and wherein the filter seat is configured to receive a filter material and wherein the peripheral edge of the base component engages a seal; and
a cover component defining a front panel, a first side panel, and a second side panel, the front panel defining a solid flat surface and a vent along a bottom of the front panel, the first side panel meeting the front panel at a first cover body crease that allows the first side panel to bend relative to the front panel, and the second side panel meeting the front panel at a second cover body crease that allows the second side panel to bend relative to the front panel;
wherein the cover component is configured to couple with the base component such that the filter material is encapsulated by the filter seat of the base component and the front panel of the cover component; and
the first side panel and the second side panel of the cover component being configured to encapsulate a raised portion and the peripheral edge of the base component when coupled with the base component.

2. The facial covering of claim 1, wherein the cover component further defines an eye shield portion that extends above the front panel.

3. The facial covering of claim 2, wherein the eye shield portion and front panel of the cover component are formed from a single sheet of material.

4. The facial covering of claim 3, wherein the material is a PETG material.

5. The facial covering of claim 2, wherein the eye shield portion is separated from the front panel by a perforated edge such that the eye shield portion can be removed from the front panel by tearing along the perforated edge.

6. The facial covering of claim 1, wherein the base component and the cover component are each separately manufactured by a thermoforming process.

7. The facial covering of claim 1, wherein the vent of the cover component, the filter material, and the manifold of the base component are in fluid flow communication with one another.

8. The facial covering of claim 1, wherein the seal is formed integral to the base component by injection-molding the seal around the peripheral edge of the base component.

9. The facial covering of claim 1, wherein the seal is molded separately from the base component and engaged with the peripheral edge of the base component.

10. The facial covering of claim 1, wherein the base component includes a raised portion defined circumferentially around the filter seat, wherein the peripheral edge is defined exterior to the raised portion.

11. The facial covering of claim 1, wherein the filter material is an N95 filter material and wherein the filter material is cut to fit a shape of the filter seat.

12. The facial covering of claim 1, further comprising:
a strap assembly configured to engage the first and second side panels of the cover component.

13. The facial covering of claim 12, wherein the strap assembly includes a plurality of straps extending from a strap ring configured for positioning behind a head of a wearer when coupled with the cover component.

14. The facial covering of claim 1, wherein the cover component and the base component are chemically coupled to one another.

* * * * *